United States Patent [19]
Hobbs et al.

[11] Patent Number: 5,265,802
[45] Date of Patent: Nov. 30, 1993

[54] FLUID PROJECTION SCREEN SYSTEM

[75] Inventors: William J. Hobbs; Roger T. Graham, both of Atlanta, Ga.

[73] Assignee: Wm. Hobbs, Ltd., Atlanta, Ga.

[21] Appl. No.: 955,476

[22] Filed: Oct. 2, 1992

[51] Int. Cl.⁵ .................................................. B05B 1/04
[52] U.S. Cl. ................................... 239/18; 239/519; 239/523; 239/524; 239/590.5
[58] Field of Search ............... 239/18, 19, 20, 22, 239/23, 505, 524, 507, 518, 513, 514, 515, 509, 510, 590.5, 519

[56] References Cited

U.S. PATENT DOCUMENTS

| | | | |
|---|---|---|---|
| 544,928 | 8/1895 | Patterson | 239/505 |
| 1,158,302 | 10/1915 | Sargent | 239/513 |
| 2,627,439 | 2/1953 | Wornall | 239/590.5 |
| 3,045,931 | 7/1962 | Hall | 239/524 |
| 3,069,100 | 12/1962 | Schuler | 239/524 |
| 3,109,593 | 11/1963 | Newland, Sr. | 239/524 |
| 3,252,661 | 5/1966 | Aldrich | 239/515 |
| 3,334,816 | 8/1967 | Mizuno | 239/20 |
| 3,351,291 | 11/1967 | Pohle | 239/513 |
| 4,974,779 | 12/1990 | Araki et al. | 239/20 |
| 4,978,066 | 12/1990 | Fuller et al. | 239/12 |
| 5,067,653 | 11/1991 | Araki et al. | 239/22 |
| 5,078,320 | 1/1992 | Fuller et al. | 239/20 |

FOREIGN PATENT DOCUMENTS 1327986  8/1987  U.S.S.R. .................. 239/590.5

*Primary Examiner*—Andres Kashinikow
*Assistant Examiner*—Christopher G. Trainor
*Attorney, Agent, or Firm*—Hopkins & Thomas

[57] ABSTRACT

A fluid projection screen is formed by projecting a substantially spatially coherent stream of fluid, such as water, and directing it against a deflection plate. The deflection plate causes the stream to be broken up into fluid droplets which form a fan shaped screen extending at an angle to the fluid stream. A projector projects an image upon the screen, and visual acuity from edge to edge of the image is achieved by imparting a bend to the deflection plate which, in turn, imparts a bend to the screen so that the distances from the center and the edges of the screen to the projector are equalized.

21 Claims, 3 Drawing Sheets

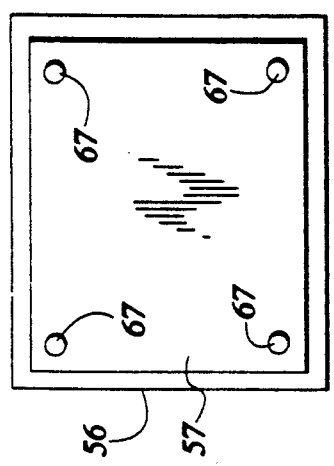
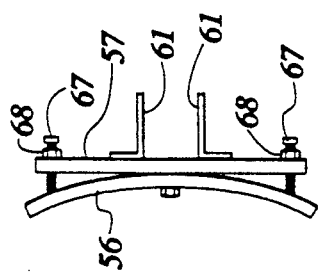
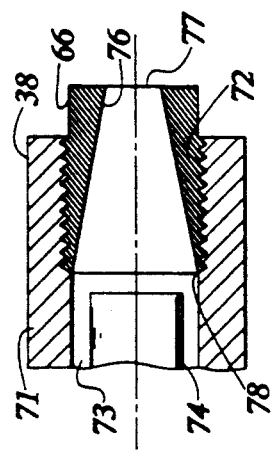
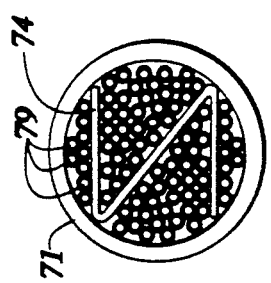
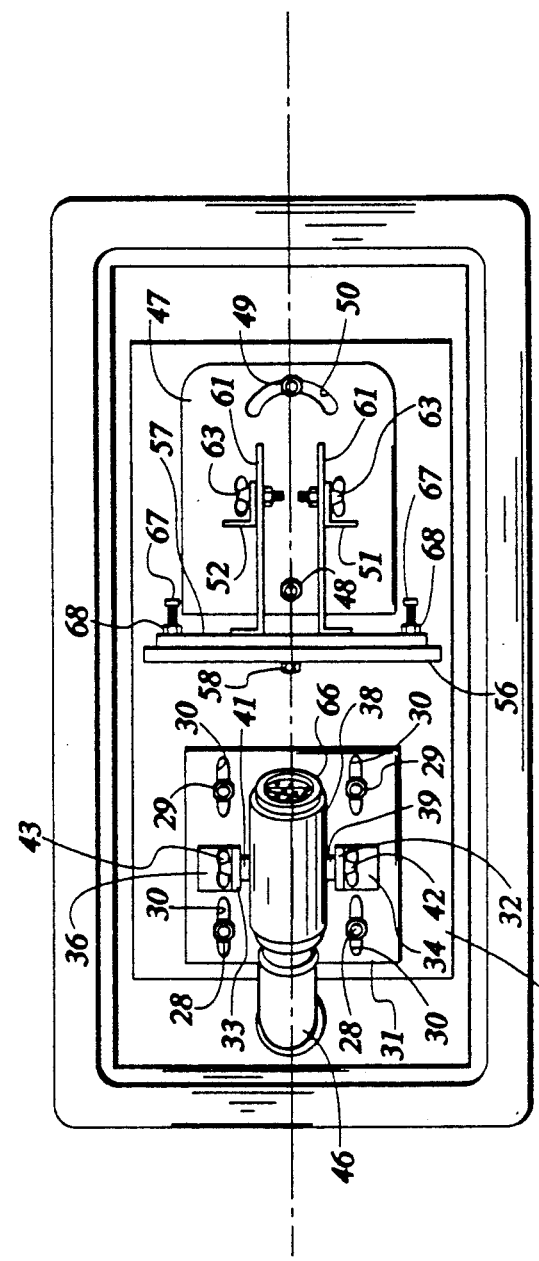

FLUID PROJECTION SCREEN SYSTEM

FIELD OF INVENTION

This invention relates to screen display systems and, more particularly, to a method and apparatus for forming a water projection screen for such a display system.

BACKGROUND OF INVENTION

In commonly used screen display systems, a display screen is formed of a generally planar sheet, and the image to be displayed is projected thereon. Unfortunately, when the display is to be out of doors, the screen size requires that the holding and bracing structure be large, in turn taking up a large amount of space as well as being unsightly. Some desired applications require the screen to be mounted over a body of water such as a lake or pond, where the support of the screen becomes extremely difficult. In virtually all such applications, the screen is cumbersome and difficult to handle and orient properly.

Displays over water have their own appeal, being capable of producing a variety of novel and pleasing as well as useful effects. Among the more interesting effects is the use of a display screen created from the water itself, upon which still, or moving, colored images are projected to create the display. The projected images may constitute advertising material, signs, moving pictures, or the like, and, when the water screen is situated over a body of water, the images at night appear to be floating in the air, creating a very pleasing effect. When the visual image is accompanied by appropriate sound, the total impact on the viewer can be stunning. These effects are not readily achievable with a large, cumbersome planar screen of wood or other sheet material. The projected images are viewed from the other side of the screen than the projector side.

There have been numerous efforts and resultant apparatus directed to creating such water displays with the principal problem being the formation of the water screen itself, whether for use on land or over water. One approach entails the use of a plurality of aligned nozzles, elevated to the desired height of the screen, into which water under some pressure is pumped. The water exiting the nozzles forms a sheet of water as it falls, and this sheet forms the display screen as the water falls back into the lake or pond, or if on land, back into the water reservoir or catch basin. Such an arrangement is not totally satisfactory because the sheet of water is formed by a plurality of discrete streams, and the effect of a smooth screen surface is marred by ripples or other irregularities in the streams. In addition, it requires a pump or pumps of significant power to raise the required amount of water at the desired pressure to the elevated level of the nozzles.

In U.S. Pat. Nos. 4,974,779 and 5,067,653 of Araki et al, there are shown several embodiments of a screen forming apparatus wherein a plurality of aligned nozzles along a floating pipe have applied thereto, under pressure, an air-water mixture. The nozzles of a first group of nozzles eject pie shaped screens of the air-water mixture, and the nozzles of a second group of nozzles, interspersed between nozzles of the first group, eject fan shaped screens of the air-water mixture which overlap the pie shaped screens to form a substantially uniform smog or fog like display screen. The nozzles may be, and preferably are, arranged to eject the water upward, and the amount of water pressure supplied by the pumping mechanism determines the height of the screen, whereas the length of the array of nozzles is determinative of the width of the screen. Where large numbers of nozzles are used, which is characteristic of prior art devices as exemplified by the Araki et al patents, a great deal of pressure is required to ensure that the farthest nozzles in the array function as desired. In addition, the more nozzles that are used, the more likely it is that one or more nozzles will become clogged up or will malfunction in operation.

In virtually all prior art devices, the main emphasis is upon creating a flat, relatively smooth surfaced display screen. However, where, as is usual with display screens over water, the screen is large, a common optical phenomenon tends to degrade the picture projected onto the flat screen. When the projector itself is substantially aligned with the centerline of the screen, the center of the screen is closer to the projector than the edges of the screen are, hence the focal distance, that is, the light path, is longer for the edges of the screen than for the center thereof. Thus, where the image at the center of the screen is in focus the images at the edges are out of focus. For small screens, this effect is barely noticeable because the human eye tends to compensate to some degree. However, for large screens, the out of focus effect is too great to be ameliorated or compensated for by the observer's eye. Most efforts to overcome this inherent defect are directed to modifying the projector lens. Some success has been achieved through the use of, for example, aspheric projector lenses. Specially formulated and ground lenses, such as aspheric lenses, however, are extremely expensive, hence some other, less expensive focus compensating arrangement is much to be desired.

SUMMARY OF THE INVENTION

The present invention is directed to overcoming the deficiencies of the prior art devices in forming a fluid, such as water, screen for use on land or water and projecting images thereon that are substantially in focus from edge to edge, both horizontally and vertically.

In a preferred embodiment thereof, the system of the invention comprises a fluid pump, which, where the system is to be used on land, has an input communicating with a source of water. Where the system is to be used on the surface of a lake or pond, the pump may be submerged, or floated on a suitable platform. The output of the pump is fed by suitable piping, either above, or preferably below, the surface of the water to a water screen generator assembly.

The screen generator assembly comprises a spatially coherent flow nozzle to which the output of the pump is fed, and which produces a high velocity, substantially spatially coherent output stream of water. This substantially coherent stream is directed against a deflection plate which causes the stream of water to break into droplets which are deflected upward in a large, fan-shaped pattern, thereby creating a fan shaped screen. The central portion of the fan shaped pattern is quite uniform in droplet density and thus, this central portion, which can be quite large, functions as the display screen with the remainder of the fan shape being barely visible, if at all. Both the nozzle and the deflection plate are mounted on a base member which can be mounted on dry land or on a suitable float device on the water.

The orientation of the nozzle and the orientation of the deflection plate are adjustable relative to each other and to the base member, thereby making it possible to configure the resulting water screen to suit the particular display parameters or requirements. Thus, the nozzle may be rotated about a horizontal axis, raised or lowered, and its supported member may be moved toward or away from the deflection plate. Such adjustments permit fine tuning of the nozzle orientation, and hence fine tuning of the display screen. In like manner, the deflection plate, which is mounted on a support member can be rotated to a degree about a vertical axis by rotating the support stand, moved up or down, and the angle of the deflection plate to the vertical can be varied to fine tune the orientation of the deflection plate relative to the nozzle.

In order to compensate for the variations in focusing distances between the center of the screen and the edges, the deflection plate is made of a semi-flexible sheet material, such as thin stainless steel plate, and means are provided for bending the plate by forcing the lateral edges thereof toward the nozzle while the center of the plate remains fixed thus presenting an arced deflection plate to the impinging water stream. The net result is the creation of an arced display screen in which the distances from the projector to the lateral edges are substantially the same as the distance to the center of the screen. To equalize the distances from the projector to the center of the lower portion of the screen and the top edge of the screen, the angles of the deflection plate and the nozzle about horizontal axes are made such that the water screen leans or tilts toward the projector, where the projector is near the surface of the water. As a consequence of the arced and angled deflection plate, and hence the arced and angled screen, the image projected onto the display screen is substantially in focus at any point, resulting in a displayed image having edge to edge sharpness.

The apparatus of the invention, in its utilization of a single nozzle, has a greatly reduced susceptibility to malfunctions, and requires, for operation, much less pump power. In addition, if a malfunction of the nozzle does occur, the nozzle can be quickly and easily replaced.

These and other features and advantages of the present invention which will be readily apparent from the following detailed description, read in conjunction with the accompanying drawings.

DESCRIPTION OF THE DRAWINGS

FIG. 3 is a plan view of the generator assembly of FIG. 2;

FIG. 4 is a partial plan view of an arrangement for bending the deflection plate of the screen generator assembly;

FIG. 4A is a rear view of the arrangement of FIG. 4;

FIG. 5 is a cross-sectional view of a portion of the nozzle of the screen generator assembly; and FIG. 6 is a cross-sectional view of the outlet portion of the nozzle.

DETAILED DESCRIPTION

Figure 1:
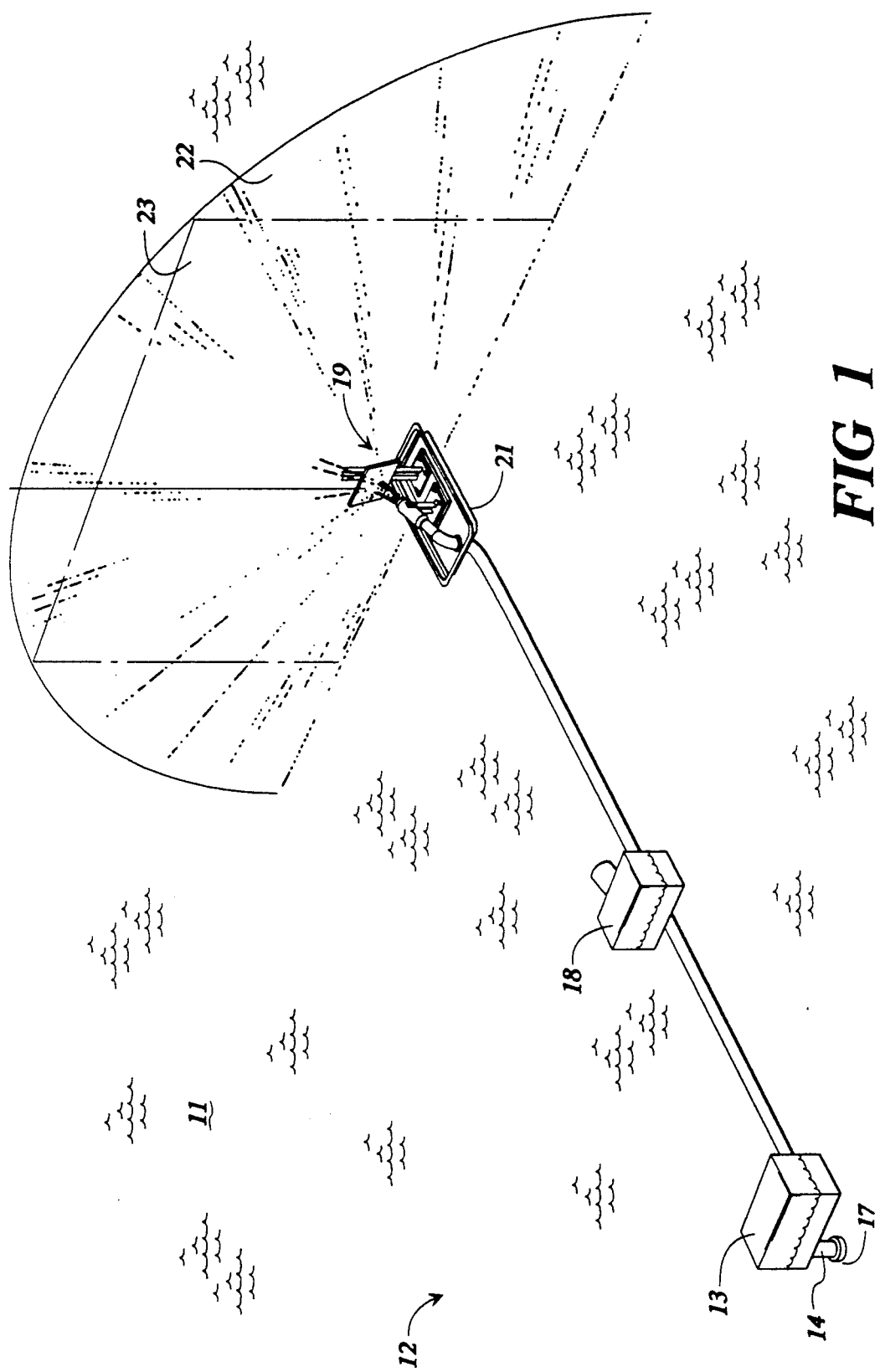
FIG. 1 is a perspective view of the display system of the present invention.

FIG. 1 depicts the display system 11 of the present invention as situated over a body of water 12 such as a lake or pond. It is to be understood that the depiction of the system over water is for purposes of illustrating the system, and is not meant to exclude other locales, such as on land out of doors, indoors, or where some of the components are on land while others are on water. The system 11 is versatile enough to be used in any of these configurations and locations. In addition, the apparatus of the invention can be embodied in readily portable form, to be carried to a desired location and set up for operation.

The system 11 comprises a water pump 13 shown mounted in a suitably anchored floating container, and having an intake pipe 14 and an outlet pipe 16. Intake pipe 14 preferably has a filter 17 for removing debris and large particles from the intake. In addition, pump 13, which may be, for example, a twenty horsepower commercially available pump, generally is equipped with a strainer, such as #5 wire mesh screening, for example. Output pipe 16 may be of polyvinylchloride piping, or of suitable flexible pipe, capable of delivering two hundred or more gallons per minute, at a flow rate of, for example, six to ten feet per second.

Pipe 16 passes near, in this case, under, a projector 18 mounted on a suitable anchored and floating platform. Pipe 16 continues on to a screen generating assembly 19, the details and operation of which will be explained more fully hereinafter. Assembly 19 is preferably mounted in a suitably anchored float, and produces, in operation, a fan shaped screen 22 of water droplets, creating a fine mist of substantially uniform density over a major portion of the fan area. This area 23 of substantially uniform density is outlined in dash-dot lines in FIG. 1. It can be appreciated that the water droplets forming the water screen fall back into the body of water 12. However, the droplets are so fine that splashing is minimized, and at night, virtually invisible.

Figure 2:
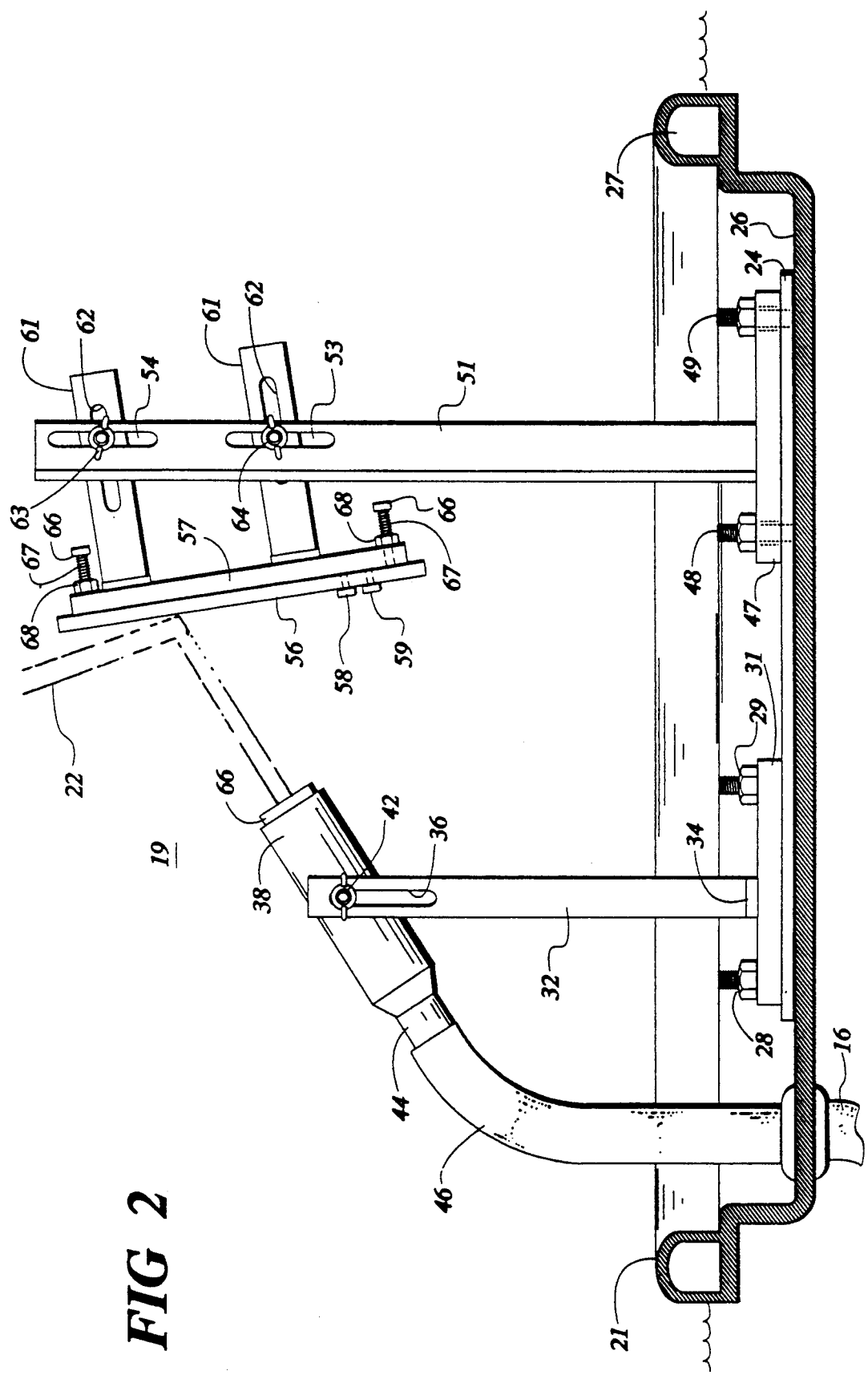
FIG. 2 is a side elevation view of the screen generator assembly.

FIG. 2 is a side elevation view of the screen generator 19, showing the basic details thereof. A base plate 24, preferably of stainless steel, is mounted to, or is otherwise affixed to the floor 26 of float member 21. Float 21 may be, for example, a ninety inch diameter fiberglass shell having a circumferential pocket 27 filled with polystyrene foam or other suitable lightweight floatable material. It is to be understood that other types and configurations of floats or mounting platforms may be used.

Mounted on base plate 24 as by bolts and nuts 28 and 29 is a first support plate 31 also preferably of stainless steel, having mounted thereon first and second vertically extending, elongated support brackets 32 and 33, which are of suitable rust resistant material, such as stainless steel, only bracket 32 being shown in FIG. 2. Each one of brackets 32 and 33 has a foot 34 or 36, integral therewith, which is affixed to support plate 31 as by welding or bolting. In the vicinity of the upper or distal end of brackets 32 and 33 are elongated slots 36 and 37, only slot 36 being shown in FIG. 2.

A cylindrically shaped spatially coherent flow nozzle 38, of rust resistant material such as brass, the details of which will be discussed more fully hereinafter, is mounted between support brackets 32 and 33 by means of bosses 39 and 41, which bear, as best seen in FIG. 3, against the inner surfaces of brackets 32 and 33. Bolts 42 and 43, having wing shaped ends, pass through slots 36 and 37 respectively and are threaded into bosses 39 and 41. Both the angle and elevation of nozzle 38 can be adjusted and set by means of slots 36 and 37 and bolts 42 and 43, which are tightened when the desired orientation is reached. Nozzle 38 has an input end 44 which is connected to a connecting hose 46 at one end thereof, the other end of hose 46 being connected to input pipe 16. Connecting hose 46 is preferably made of flexible material such as vinyl tubing, to allow for adjustments in the angle and elevation of nozzle 38, and, while it is not essential, it is preferable that hose 46 be as free as possible from sharp bends, so that turbulence in the water entering the input 44 of nozzle 38 is minimized, at least to some extent. Also mounted to base plate 24 is a second support plate 47, aligned with and spaced from plate 31. Suitable nut and bolt assemblies 48 and 49 affix support plate 47 to base plate 24. A pair of L-angled vertically extending elongated brackets 51 and 52, only 51 being shown in FIG. 2, are affixed to support plate 47 as by welding. Bracket 51 has first and second aligned slots 53 and 54 along the upper portion thereof, as shown in FIG. 2. Bracket 52, not shown, is also equipped with such slots.

A flat deflection plate 56, which may be, for example, rectangular in shape and of a suitable material such as stainless steel, is affixed to a support plate 57 as by bolts 58 and 59. Bolts 58 and 59 are located so as to prevent interference with the water stream exiting nozzle 38 and impinging on plate 56. Mounted on the rear surface of plate 57, as by welding, are four substantially identical support arms 61. Because the arms are substantially identical, they are all identified by the single reference numeral 61. Each of the arms 61 has an elongated adjusting slot 62 extending from a point adjacent the distal end of the arms 61 toward the center thereof, and the arms 61 are spaced to bear against the inner surfaces of brackets 51 and 52, as best seen in FIG. 3. Wing bolts and nut assemblies 63 and 64 are insertable into slots 53 and 62, and 54 and 62 on each brackets 51 and 52 so that deflection plate may be moved toward and away from the output end 66 of nozzle 38, and also angled in relation thereto. In addition, plate 56 may be raised or lowered. When the desired location and orientation of plate 56 is achieved, the wing bolt and nut assemblies are tightened to maintain plate 56 in its desired position.

In order that curvature may be imparted to deflecting plate 56, which will be discussed more fully in connection with FIG. 4, adjusting screws 67, 67 are threaded into and through plate 57 so that their ends bear against the rear surface of deflection plate 56, and are locked in the desired position by lock nuts 68, 68.

FIG. 3 is a plan view of the screen generator assembly of FIG. 2, with the plate 56 shown in a substantially vertical position. Support plate 31 has four elongated slots 30 into which mounting bolts 28, 28 and 29, 29 are inserted with plate 31 being free to move toward and away from the deflecting plate 56 when the bolts are loosened, thereby enabling positioning of the nozzle 38 with respect to the plate 56, after which bolts 28 and 29 are tightened to hold plate 31 and hence, nozzle 38 in position. Thus, the position of nozzle 38 can be fine tuned as to elevation, angle and distance from deflection plate 56. Support base 47 has an arcuate slot 50 into which bolt and nut assembly 49 is inserted. When bolts 48 and 49 are loosened, plate 47 can be pivoted or rotated about bolt 48, thereby varying the angle of plate 56 relative to nozzle 38 about a vertical axis. Thus, with deflection plate 56 mounted as shown in FIGS. 2 and 3, the position and orientation thereof can be fine tuned relative to the nozzle as to elevation, separation, angle about a horizontal axis, and angle about a vertical axis. FIGS. 2 and 3 show a very basic arrangement for mounting and adjusting both the nozzle 38 and deflection plate 56 so that optimum operation may be achieved in producing a display screen. The numerous individual adjustments also make it possible to compensate, at least to some extent, for ambient wind conditions which might tend to distort the display screen. It is within the scope of the present invention to reduce the number of individual adjustments, or to make such adjustments less time consuming by ganging some of the adjustments together, or possibly automating them, at least to some extent, or by remotely controlling such adjustments.

In operation, the pump 13 supplies, through conduit 16, water at, for example, two hundred gallons a minute, with a flow rate of approximately six to ten feet per second, to laminar flow nozzle 38. Nozzle 38, as will be discussed more fully hereinafter, produces a substantially spatially coherent output stream of water approximately one and one-eighth inches in diameter, for example, with a velocity of, for example, fifty feet per second. By spatially coherent is meant a stream of water that does not vary to a significant extent in diameter. When the stream of water impinges on deflection plate 56, it is deflected both upward and outward in the form of water droplets, as discussed hereinbefore, and produces a fan-shaped screen in the form of a fine mist. With the quantities and rates specified, the maximum width of the screen is approximately fifty-five feet and the maximum height is approximately twenty-six feet, with an optimum usable area as shown in FIG. 1, which may be as much as eight or nine hundred square feet. The size of the screen can be varied by variations in velocity or flow rate of the stream.

As thus far described, the system of FIGS. 1, 2 and 3 produces a substantially planar or flat screen. As discussed hereinbefore, such a screen is adequate for displays having a relatively small area, however, the edge sharpness of the image deteriorates directly in proportion to the increase in size of the image area. In accordance with the principles of the invention, the edge sharpness of the image on the screen is materially enhanced, both along the top edge and along both lateral edges so that the image projected on the screen is of substantially uniform sharpness throughout the entire area thereof. In FIG. 2, it can be seen that the angle of the deflection plate 56 relative to the nozzle 38 can be adjusted to impart to the screen 22 a tilt or slope toward the projector 18. When the projector 18 is near the surface of the water 12 or the ground, this tilt has the effect of equalizing the distances from the projector 18 to the top edge of the screen 22 or 23 and to the bottom edge thereof, thereby assuring substantially uniform sharpness of the image from top to bottom.

In FIGS. 4 and 4A there is shown an arrangement in accordance with the invention, for achieving substantially uniform lateral edge to edge sharpness of the image. The deflection plate 56, which may be a rectangular sheet of, for example, sixteen to twenty gauge stainless steel of appropriate size, such as ten inches high by eighteen inches wide is mounted to the backing plate 57 by bolts 58 and 59, which, as pointed out hereinbefore, are located so as not to interfere with the impinging water stream from nozzle 38. Threaded into and through plate 57 are adjusting screws 67, 67, preferably located in the corner regions of plate 57, as shown in FIG. 4A, screws 67, 67 preferably have rounded ends adapted to bear against the rear surface of deflection plate 56. When adjusting screws are screwed into and through plate 57, they bend the lateral edges of plate 56 away from plate 57, thereby imparting a curvature to plate 56, as shown in FIG. 4, which, in turn, imparts a curvature to screen 22, equalizing the distances from the projector 18 to the center of the screen 22 and to the lateral edges thereof. When these distances are equalized, the screen approximates an arc with the projector as the center or focal point thereof. The curvature of screen 56 can thus be adjusted until the projected image appears to have edge to edge sharpness, after which adjusting screws 67, 67 are locked in place by means of lock nuts 68, 68.

In the screen generator apparatus 19 of the present invention, it is desirable that the screen forming water droplets, after leaving the deflection plate 56, do not spread too much, i.e., that the water screen retain a fairly tight or uniform thickness. However, because of the deflection mechanism used by the invention, some widening or spreading of the screen is inevitable. Such spreading can, however, be minimized if the output stream of water from nozzle output 66 is substantially spatially coherent flow, or at least an approximation thereof. In FIGS. 5 and 6 there is shown, in accordance with a feature of the invention, an arrangement for nozzle 38 for achieving spatially coherent, or guasi-laminar flow at the output 66 thereof. Nozzle 38 comprises an elongated tubular member 71 having internal threads 72 at one end, i.e., the output end, thereof. Member 71 is preferably made of a rust resistant material such as brass, for ease of machining. Member 71 has a longitudinally extending bore 73 into which is inserted an elongated Z shaped turbulence reducing member 74 which, as shown in FIG. 5, bears against the interior wall of member 71, thereby remaining substantially fixed in place during operation of nozzle 38. Threaded member 71 is an output member 66 having a tapered bore 76 terminating in the output opening 77. The bore 76 at the end of member 66 opposite the output is the same diameter as the bore 73 so that at the junction 78 of the two bores 73 and 76, there is a smooth, discontinuity free transition. Nozzle 38, with turbulence reducer 74 approximates a high velocity compressed uniform, i.e., spatially coherent stream at its output which, after impinging upon deflection plate 56, produces a display screen 22 that expands from a thickness of approximately three-quarters of an inch at the deflection plate 56 to approximately a thickness of two inches at the outer usable limits of screen 22. Thus, there will be no discernible distortion of the image projected upon the screen 22. The uniformity of the screen can be enhanced further by the addition of elongated "straws" 79, hollow tubular members of stainless steel having an inner diameter of approximately one-eighth inch, which fill the spaces within bore 73 defined by member 74, as shown in FIG. 5. The "straws" assist in reduction of turbulence of the water under pressure flowing through nozzle 38, so that the output at opening 77 is a round, substantially turbulence free and uniform high velocity stream directed at deflection plate 56.

In the foregoing, most of the elements have been described as being made of stainless steel. It is to be understood that preferably all of the metallic elements are of rust or oxidation resistant material, the nozzle 38, for example, being of a material such as brass, but stainless steel would likewise serve the purpose.

In operation, the stream of water from pump 13 is directed into screen generator assembly 19 where it is deflected upward and outward to form a display screen 22. The elements of assembly 19 are fine tuned to achieve the desired image display area and to achieve edge to edge sharpness of the displayed image, as pointed out in the foregoing. Thus the resultant display screen possesses optical qualities that make the image displayed thereon both clear and sharp.

The principles of the invention have been disclosed in an illustrative, preferred embodiment thereof which produces a water display screen requiring only a single nozzle. It is to be understood that these principles are applicable to other materials than water, and to other locations than in and over a pond. Numerous changes and alterations may be made to the apparatus by workers in the art without departure from the spirit and scope of the invention.

We claim:

1. A display screen generator for generating a fluid display screen, said generator comprising;
   stream forming means for producing a substantially spatially coherent stream of fluid axially along a path;
   deflection means disposed in the path of the stream of fluid and spaced downstream from said stream forming means for breaking up the stream into a plurality of droplets and directing the droplets in a direction at the angle to the path;
   said deflection means comprising a member having a first upper edge above the axis of the path and first and second side edges on either side of the axis of the path;
   first means for moving said first upper edge toward said stream forming means; and
   second means for moving said first and second side edges toward said stream forming means independently of said first means and independently of each other.

2. A display screen generator as claimed in claim 1 wherein said deflection means comprises a plate member disposed in said path against which said stream is directed.

3. A display screen generator as claimed in claim 2 wherein said plate member is adjustable about a first axis to vary a first angular relationship between said plate and said path.

4. A display screen generator as claimed in claim 3 wherein said plate member is adjustable about a second axis to vary a second angular relationship between said plate and said path.

5. A display screen generator as claimed in claim 2 wherein said second means comprises means for imparting a curvature to said plate.

6. A display screen generator as claimed in claim 1 wherein said means for producing a substantially spatially coherent stream comprises a nozzle.

7. A display screen generator as claimed in claim 6 wherein said nozzle comprises an elongated substantially tubular member having fluid turbulence reducing means disposed along at least a portion of the interior length thereof.

8. A display screen generator for generating a fluid display screen, said generator comprising;
   a first means having an output end for producing a substantially spatially coherent stream of fluid and directing it axially along a path;
   first support means for said first means;
   means for pivotally mounting said first means to said support means for adjusting the direction of the path of the stream;
   deflection means for deflecting the stream;

second support means for supporting said deflecting means in the path;

means for mounting said deflection means to said second support means including first adjustable means for moving said deflection means about an axis at an angle to the axis of the path to vary a first angle of said deflection means with respect to the path;

second adjustable means for moving said deflection means independently of said first adjustable means about a second axis at an angle to the axis of the path to vary a second angle of said deflection means with respect to the path; and third adjustable means for moving at least a portion of said deflection means independently of said first and second adjustable means about an axis at an angle to the axis of the path.

9. A display screen generator as claimed in claim 8 wherein said support means for said first means comprises means for varying the distance between the output end of said first means and said deflection means.

10. A display screen generator as claim in claim 8 wherein said deflection means comprises;
a support plate;
a deflection plate mounted on said support plate; and
wherein said third adjustable means comprises means on said support plate for bending at least a portion of said deflection plate.

11. A display screen generator as claimed in claim 10 wherein said deflection plate has lateral edges and said means for being comprises means for forcing at least one of said lateral edges toward said output end of said first means.

12. A display screen generator as claimed in claim 10 wherein said means for bending comprises at least one member passing through said support plate to bear against said deflection plate.

13. A screen display system having a fluid projection screen comprising
means for directing a fluid under pressure to a screen generating assembly, and
projector means for projecting an image having a center and both lateral and top and bottom edges on said projection screen,
said screen generating assembly having means for forming said projection screen from said fluid under pressure, and
means for enhancing the edge sharpness of the projected image on said screen comprising means for equalizing the distance from said projector to the said edges of the image and the center thereof.

14. A screen display system as claimed in claim 13 wherein said means for enhancing the edge sharpness of the projected image comprises means for causing the projection screen to slope toward said projector.

15. A screen display system as claimed in claim 13 wherein said means for enhancing the edge sharpness of the projected image comprises means for imparting a curvature to said projection screen.

16. A screen display system as claimed in claim 15 wherein said means for enhancing the edge sharpness forms the projection screen in the shape of an arc centered on said projector.

17. A method of forming a fluid display screen comprising:
creating a stream of fluid under pressure and directing said stream of fluid along a path;
deflecting said stream from said path sufficient to form a display screen of fluid droplets at an angle to the path; and
imparting a tilt to said planar display screen relative to the vertical.

18. A method of forming a fluid display screen comprising:
creating a stream of fluid under pressure and directing the stream along a path;
deflecting the stream from the path sufficient to form a display screen of fluid droplets at an angle to the path; and
imparting a curvature to said screen to form substantially an arc whereby the center of the screen and the edges thereof are substantially equidistant from the fixed point.

19. A method of displaying images upon a fluid display screen comprising:
creating a substantially spatially coherent flow stream of fluid under pressure along a path;
deflecting the stream from the path sufficient to form a display screen of fluid droplets at an angle to the path and having a center and lateral and top and bottom edges;
projecting an image onto the screen from a point spaced from the screen along a line substantially normal thereto; and
substantially equalizing the distance from said point to the top and bottom edges of the screen.

20. A method of displaying images upon a fluid display screen comprising:
creating a substantially spatially coherent flow stream of fluid under pressure along a path;
deflecting the stream from the path sufficient to form a display screen of fluid droplets at an angle to the path and having a center and lateral and top and bottom edges;
projecting an image onto the screen from a point spaced from the screen along a line substantially normal thereto; and
substantially equalizing the distance from the point to the lateral edges of the screen.

21. A method of displaying images upon a fluid display screen as claimed in claim 20 and further including the step of substantially equalizing the distance from said point to the top and bottom edges of the screen.

* * * * *